Figure 1:
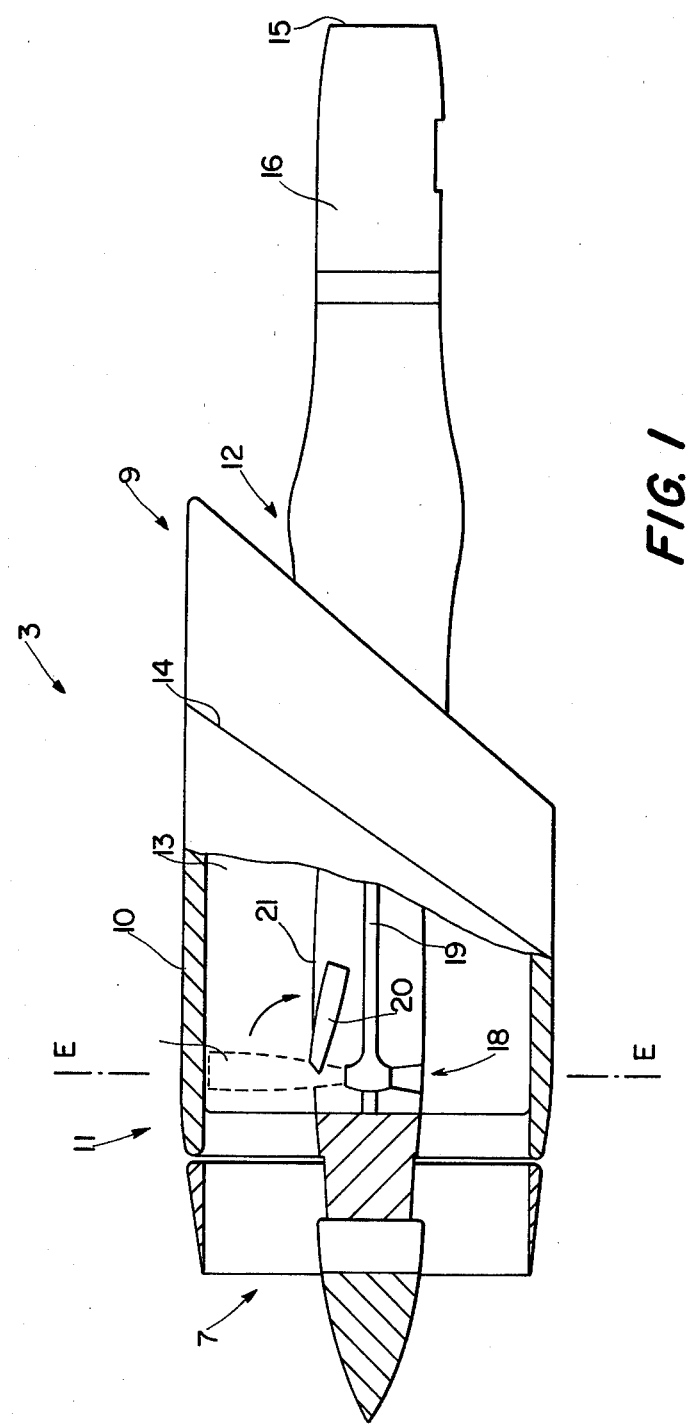

United States Patent [19]

Ritchie

[11] 4,394,109

[45] Jul. 19, 1983

[54] ARRANGEMENT AND EQUIPMENT FOR THE DISPLACEMENT OF BLADES, PARTICULARLY PROPELLER BLADES

[75] Inventor: Donald Ritchie, Immenstaad, Fed. Rep. of Germany

[73] Assignee: Dornier GmbH, Fed. Rep. of Germany

[21] Appl. No.: 119,806

[22] Filed: Feb. 8, 1980

[51] Int. Cl.³ .............................................. B64C 11/28
[52] U.S. Cl. ....................................... 416/142; 416/87
[58] Field of Search ............ 416/142 R, 142 A, 142 B, 416/87, 88–89; 415/133

[56] References Cited

U.S. PATENT DOCUMENTS

| | | | |
|---|---|---|---|
| 997,884 | 7/1911 | Wells | 416/142 |
| 1,277,181 | 8/1918 | Blake | 416/142 B |
| 1,728,768 | 9/1929 | O'Connor | 416/142 X |
| 2,955,656 | 10/1960 | Balje et al. | 416/142 X |
| 2,981,339 | 4/1961 | Kaplan | 416/142 |
| 2,986,219 | 5/1961 | Boardman et al. | 416/88 |
| 3,016,217 | 1/1962 | Polleys et al. | 416/142 X |
| 3,026,085 | 3/1962 | Whippen et al. | 416/87 |
| 3,143,323 | 8/1964 | Hollrock | 416/87 X |
| 3,175,619 | 3/1965 | Reed | 416/142 X |
| 3,589,647 | 6/1971 | Burkham | 416/123 X |
| 3,957,229 | 5/1976 | Davis | 416/142 X |
| 4,130,378 | 12/1978 | Eichler | 416/188 |

FOREIGN PATENT DOCUMENTS

| | | | |
|---|---|---|---|
| 2536 | of 1888 | United Kingdom | 416/142 |
| 500363 | 5/1976 | U.S.S.R. | 416/87 |
| 612062 | 6/1978 | U.S.S.R. | 416/142 |

Primary Examiner—Everette A. Powell, Jr.
Attorney, Agent, or Firm—James E. Bryan

[57] ABSTRACT

This invention relates to an improvement in equipment for the adjustment of blades, particularly propeller blades of fans, turbines, and the like, and especially for propulsion plants on aircraft, adapted to be selectively shut-off in a low-resistance position, the improvement comprising means whereby said blades are selectively foldable out of the operating position thereof about pivot axes transversely to their longitudinal axes, whereby said axes being tangential with respect to a common base circle are inclined with respect to the axis of rotation of said propeller blades in dependence upon the degree of twist of the blades, so that the blades in the folded-in position thereof are positioned next to each other jointly as parts of an imaginary cylindrical or conical envelope surface having a helical path with respect to the longitudinal envelope surface axis.

4 Claims, 10 Drawing Figures

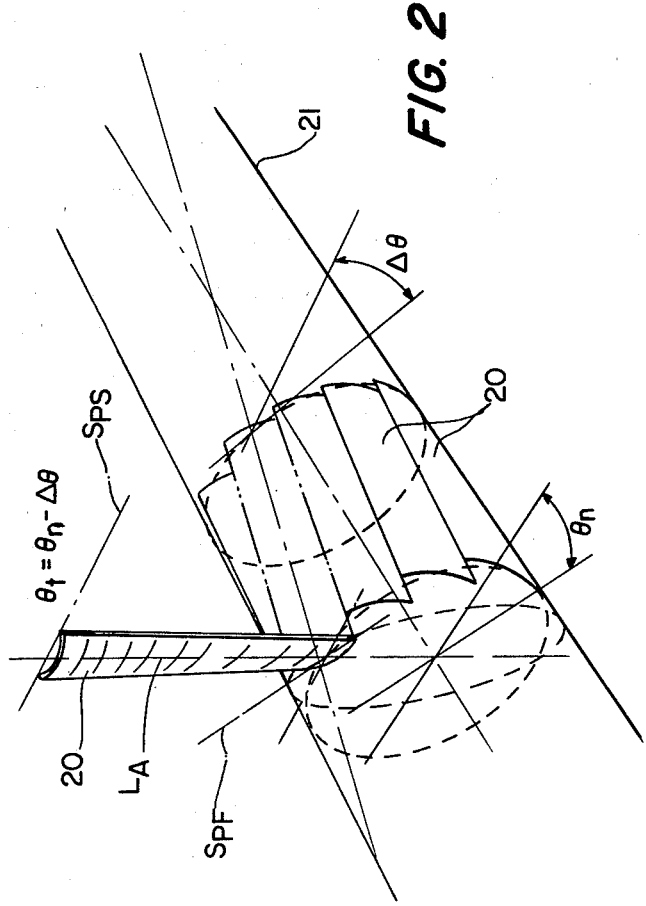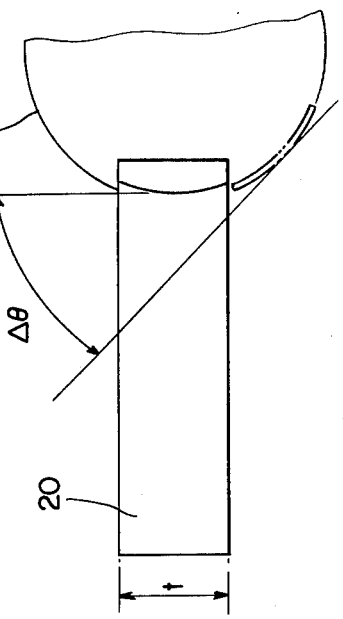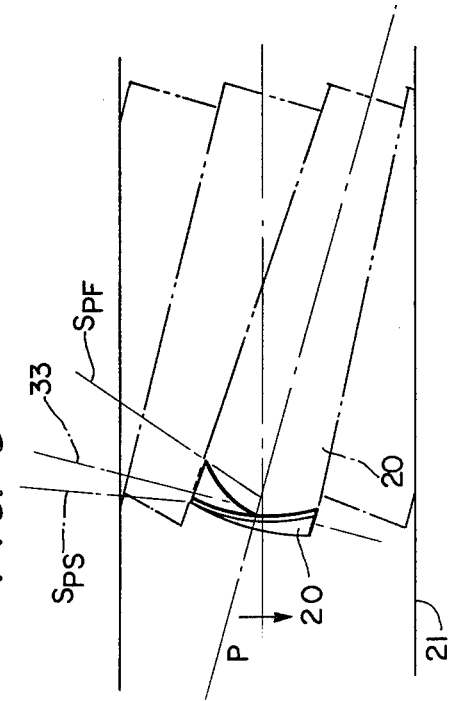

ARRANGEMENT AND EQUIPMENT FOR THE DISPLACEMENT OF BLADES, PARTICULARLY PROPELLER BLADES

The present invention relates to an arrangement and equipment for the displacement of blades, particularly propeller blades of fans, turbines, or the like, being adapted to be selectively shut-off in a low drag position, especially for propulsion plants on aircraft.

For an economical operation of aircraft, or in emergencies, it may be advantageous to shut down parts of a propulsion plant, and to simultaneously displace or shift the propeller blades, or the like, which are coordinated to the propulsion plants and serve for producing foward thrust in a setting angle position which reduces the air drag.

This may be done, for example in the case of power gliders, in connection with the shut-down of the propulsion plant for the gliding flight phase. Likewise it is known, in the case of failure of the propulsion plant in motorized airplanes, to bring the propeller blades in a low drag position. Various types of adjustment devices have been proposed for this particular purpose.

Also in so-called dual-cycle propulsion plants it would be desirable, for specific flight phases, to shut down the fan which operates economically at low flying speeds, but uneconomically at higher flying speeds, and to bring the fan blades in a low drag position so that the annular space of the shrouded fan is traversed at low drag, and hence the air drag of the aircraft as a whole is reduced.

It is the object of the present invention to arrange and provide the fan blades, propellers, or the like, in such a manner that the air drag produced by the propeller blades, or the like, at the time of the shut-down of the coordinated propulsion plant is reduced to a minimum.

The object outlined above is obtained, according to the present invention, by virtue of the fact that the blades are selectively foldable, from their operating position about pivot axes transversely to their longitudinal axes, whereby the axes being tangential with respect to a common base or pitch circle are provided in an inclined fashion with regard to the axis of rotation of the fan or propellers in dependence upon the degree of twist of the blades, and specifically so that the blades, in the folded-in position thereof, are jointly positioned next to each other as components of an imaginary cylindrical envelope extending helically along the axis of the envelope. By virtue of the special arrangement of the propeller blades or the like, and the pivot axes thereof, in dependence upon the degree of the blade twist, the blades when in the folded-in position jointly form a generated envelope surface which is extremely favorable from the point of view of aerodynamics, and which may be either a cylindrical or a conical surface, depending upon whether the blades have a blade depth that remains the same over the longitudinal blade extension, or one that is reduced. Thereby it is avoided that the blades in the folded-in position thereof project interferingly into the flow because of their twist.

Independently of the degree of twist of the blades it is thereby possible to preserve the predetermined angle of incidence for the operating position of the blades by a corresponding inclination of the pivot axes, being tangential to a common base circle, with respect to the plane of rotation.

Figure 5:
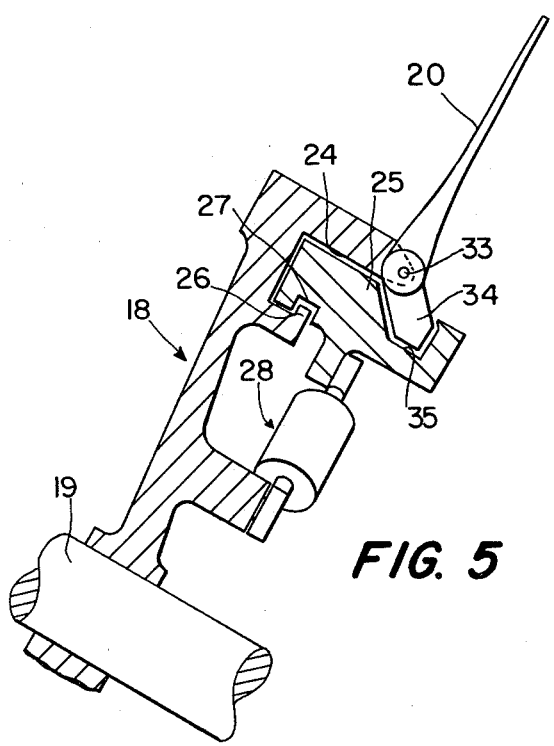
Figure 6:
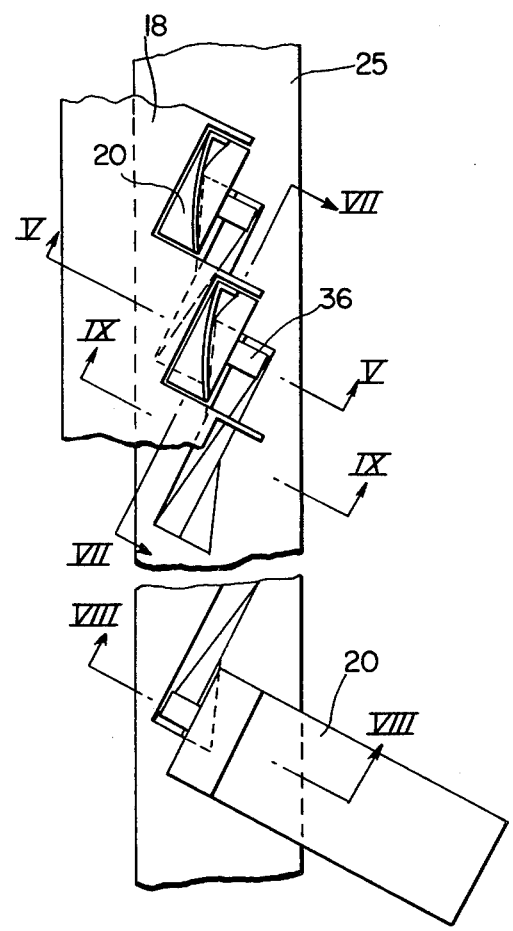
Figure 7:
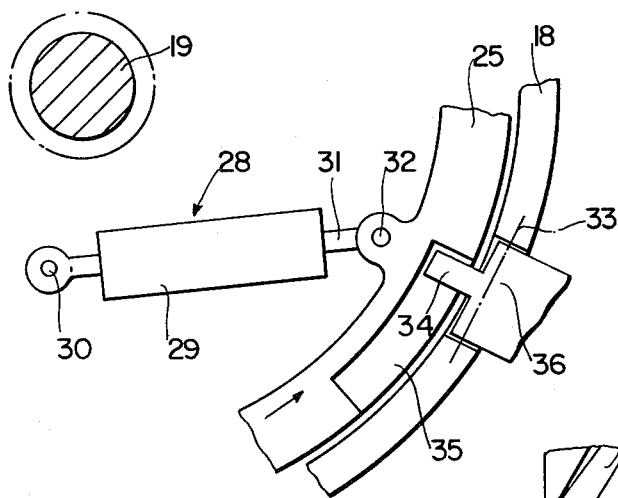
Figure 8:
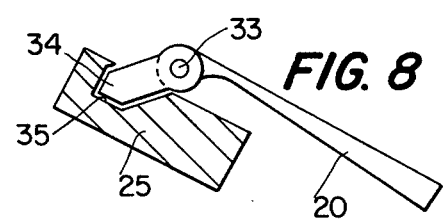

One embodiment according to the present invention will be described hereinafter in further detail on the basis of the accompanying drawings, wherein FIG. 1 illustrates an arrangement with one propulsion plant each being positioned on both sides of the lengthwise vertical cross-section of the aircraft in a side view thereof and partially in a longitudinal cross-section, the aircraft itself not being shown therein;

FIGS. 2 to 4 illustrate, in a section of FIG. 1, at an enlarged scale and represented schematically, the folding principle for the blades, FIGS. 5 to 10 illustrate the structural design of the folding blade mechanism, taken along the cross-sectional lines V—V, VII—VII, VIII—VIII, and IX—IX of FIG. 6, and FIG. 6 is a partial top plan view of the fan impeller.

As is apparent from FIG. 1 of the accompanying drawings, only one of the propulsion plants is shown therein for the sake of simplification. Reference numeral 3 therein identifies the propulsion plant, while reference numeral 7 serves to identify the air intake opening thereof. The propulsion plants 3 employed in this case are so-called by-pass engines or fan power engines, provided in each case with an exterior shroud or cowling 10 and a main propulsion plant 12. The aforementioned exterior shroud or cowling 10 is constructed as a lift-supplying annular wing. Further visible in this figure are also the jet pipe 16 of the main propulsion plant 12 being mounted within the shroud or cowling 10, as well as the coordinated displaceable exhaust nozzle 15, in conjunction with the jet-deflecting device 9 positioned behind the annular wing 10.

The main propulsion plant 12 supplying the primary propellent gas jet includes, in known manner, the low-pressure compressor, the high-pressure compressor, the combustion chambers and the gas turbine. The main propulsion plant 12 further includes a low-pressure turbine for the drive of the fan 11, and the jet exhaust in tandem with the low-pressure turbine, and which leads to the jet pipe 16 and to the jet exhaust nozzle 15.

The fan 11 is driven by the main propulsion plant 12 by way of a central drive shaft 19, and the drive shaft 19 is connected to the low-pressure turbine of the main propulsion plant 12. The fan impeller 18 with its blades 20 is positioned at a distance ahead of the air inlet of the main propulsion plant 12 within the shroud or cowling 10, and the drive shaft 19 is positioned within a central casing 21 for purposes of the formation of the annular channel 13 for the secondary air current. The discharge opening 14 for the secondary jet of the fan 11 carries in this case the jet-deflecting device 9. This jet-deflecting device 9 includes deflector blades mounted in a cascade-type manner, whereby the rear section of the fan cowling 10 changes over from a circular cross-section into a rectangular cross-section for the connection of the jet-deflecting flaps. The jet-deflecting flaps are shown in this case in the extended position thereof for cruising flight.

Shown in FIGS. 2 through 10 is an exemplified construction for the fan 11 with fan blades being adapted to be folded in a low-drag position.

According to the principle illustrated in FIGS. 2 to 4, the fan blades 20 are folded in juxtaposition in dependence upon their twist between the chord line $S_{PF}$ at the blade root and $S_{PS}$ at the blade tip with the respectively required setting angle against the incident flow in the manner of a bundle about the pivot axes 33 in a helical manner with respect to an imaginary cylindrical or conical surface. The surface may be the central casing 21, in which case it may serve as a support for the blades 20 in their retracted position. The blade twist angle is herein identified with reference symbol $\Delta_\theta$, the pitch angle of the blade root with $\theta_n$, and the pitch angle of the blade tip with $\theta_t$. Furthermore, reference letter t identifies the blade depth, and the arrow P the incident flow direction of the blades. $L_A$ is the longitudinal axis of the fan blades 20, and reference letters E—E designate the plane of rotation of the fan impeller 18 (FIG. 1).

Figure 10:
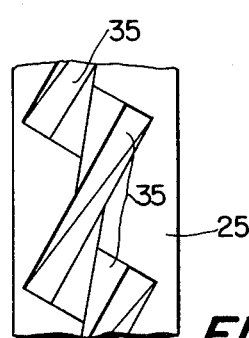
Figure 9:
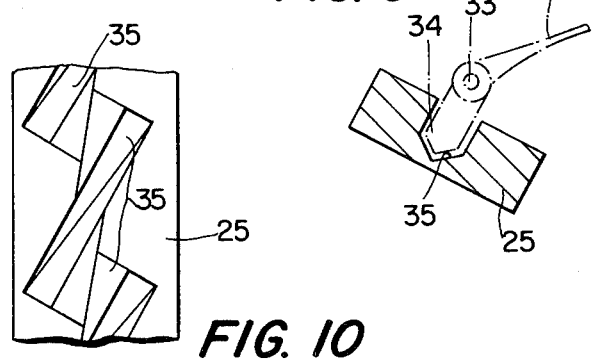

FIGS. 5 through 10 illustrate the structural details of the arrangement with foldable fan blades 20. It is apparent from FIG. 5, in conjunction with FIGS. 6 and 7, that the fan impeller 18 includes an annular recess 24 for receiving a setting ring 25, and the ring 25 is relatively rotatable with respect to the fan impeller 18. For the purpose of guiding the setting ring 25, there is provided at the fan impeller 18 an annular projection 26 for engagement into a corresponding annular T-slot 27 at the setting ring 25. For the assembly of the setting ring 25, the projection 26 is adapted to be screwed in at the fan impeller 18, not shown herein for the sake of simplification. Machined into the outside circumference of the setting ring 25 are switching or control grooves 35 extending helically in the circumferential direction, into which engage the trip cams 34 of the fan blades 20 being pivotal about the pivot axes 33 at the fan impeller 18. The path of the switching grooves 35 at the outside circumference of the setting ring 25 is represented in FIG. 10.

Provided for the relative rotation of the setting ring 25 with respect to the fan impeller 18 is a hydraulically-operated setting motor 28, the operating cylinder 29 thereof being supported by way of a pivot axis 30 at the fan impeller 18, and whose operating piston 31 engages hingedly at the setting ring 25 by way of a pivot axis 32. The respectively coordinated pressure medium control means for the setting motor 28 is provided in the customary manner and therefore is not further described herein. For the extended position of the fan blades 20, there is coordinated to each of the blades a stop 36 which is supported, in the longitudinal direction of the switching grooves 35, at the fan impeller 18 in the folded-out position.

The operation of the inventive construction described herein is as follows:

For cruising flight (supersonic flight), the gas jet (the primary gas jet) of the main propulsion plant 12 is supplied to the jet (exhaust) nozzle 15 for generation of forward thrust. At the same time the low-pressure turbine is shut-down. The annular channel 13 of the fan 11 is freely flown through by the secondary jet, while the deflector blades are in the extended position thereof. In order to impair the free flow-through to the smallest possible extent, the fan blades 20 are positioned, in this high-speed flying phase, in the folded-in position thereof, shown in FIG. 1 in continuous lines, around the central casing 21. For the purpose of folding-in the blades 20, the setting motor 28 is actuated, and thus a relative movement is effected between the fan impeller 18 and the setting ring 25. During this relative rotation, the trip cams 34 of the fan blades 20 are helically guided within the switching grooves 35 so that the fan blades 20 are moved out of the extended position thereof, as shown in FIG. 5, by way of intermediate positions according to FIG. 1 into the final retracted position according to FIGS. 1 and 8. In this position, all of the fan blades 20, as a consequence of the inclined position of their pivot axes 33, relative to the plane of rotation of the blades 20, and in dependence upon the blade twist angle $\Delta_\theta$, form a closed cylindrical surface.

Due to this retracted position, the annular channel 13 of the fan 11 is completely open and any obstruction of the secondary jet by the fan blades 20 is avoided to the largest possible extent. Assured thereby is also a flawless air inlet into the intake opening of the main propulsion unit 12. The shroud 10 of the fan 11 serves in this high-speed phase for producing lift. For hovering flight, the setting ring 25 is turned by means of the setting motors 28, and relative to the fan impeller 18 into a position apparent from FIGS. 5, 6, and 7. During the relative rotation of the setting ring 25 with respect to the fan impeller 18 by means of the cams 34, the fan blades 20 are moved out of the position illustrated in FIG. 8 about the axes 33 by means of the helically-extending switching grooves 35 into the extended position which is evident from FIG. 10. The fan 11 supplies, at that time, the essential part of the vertical thrust. For jet-supported flight, the deflector flaps of the deflecting device 9 are in a deflected position, which is not illustrated herein.

It will be obvious to those skilled in the art that many modifications may be made within the scope of the present invention without departing from the spirit thereof, and the invention includes all such modifications.

What is claimed is:

1. In equipment for the adjustment of rotor blades, particularly propeller blades of fans, turbines, and the like, and especially for propulsion plants on aircraft adapted to be selectively shut-off in a low-resistance position, said equipment including a rotor hub with blades pivotally mounted thereon, said blades (20) having a longitudinal axis ($L_A$) and a twist ($\Delta_\theta$) about said axis ($L_A$) between the chord line ($S_{PF}$) at the blade root and the chord line ($S_{PS}$) at the blade tip, the improvement comprising means whereby said blades (20) are each selectively pivotal about pivot support means on the hub into an operational or a collapsed position, said blades (20) when collapsed forming, by means of the position of pivot axes (33) of said pivot support means, helical cut-outs of a common cylindrical or conical envelope with the longitudinal axes ($L_A$) extending at a slant imparted by the twist ($\Delta_\theta$) with respect to the longitudinal direction of said envelope, the position of the pivot axes (33) at a common base circle being determined by the slant of the pivot axes (33) with respect to the plane of rotation (E—E) of said blades (20) and by the slant of the axes (33) with respect to the chord line ($S_{PF}$) at the blade root.

2. Equipment according to claim 1 in which for blades having a blade depth tapering from the blade root to the blade tip, the blades enclose an imaginary conical envelope surface in the folded-in position thereof, whereby the degree of tapering of the blades represents a function of the cone angle of the conical envelope surface.

3. Equipment according to claim 1 or claim 2 including setting ring means for pivoting the blades about the pivot axes, said setting ring means being relatively rotatable with respect to a fan impeller and including switching groove means extending in a helically inclined manner with respect to the circumferential direction for the engagement of trip cam means at the blades.

4. Equipment according to claim 3 including selectively actuatable setting motor means for effecting relative rotation of the fan impeller and the setting ring.

* * * * *

UNITED STATES PATENT AND TRADEMARK OFFICE
CERTIFICATE OF CORRECTION

PATENT NO. : 4,394,109

DATED : July 19, 1983

INVENTOR(S) : Donald Ritchie

It is certified that error appears in the above-identified patent and that said Letters Patent is hereby corrected as shown below:

Item [30[ has been omitted and should read as follows:

- - - Foreign Application Priority Data
April 28, 1979 [DE]   Fed. Rep. of Germany ...2917346   - - -

Signed and Sealed this

Seventeenth Day of July 1984

[SEAL]

*Attest:*

GERALD J. MOSSINGHOFF

*Attesting Officer*   *Commissioner of Patents and Trademarks*